(12) United States Patent
Huber et al.

(10) Patent No.: US 6,412,814 B1
(45) Date of Patent: Jul. 2, 2002

(54) GAS GENERATOR WITH CONTROLLABLE FLUID INJECTION

(75) Inventors: Johann Huber, Rattenkirchen; Markus Lindner, Birkenfeld; Herbert Ragner, Furth; Marc Winterhalder, Garching an der Alz; Michael Gabler, Mühldorf, all of (DE)

(73) Assignee: TRW Airbag Systems GmbH & Co. KG, Aschau/Inn (DE)

( * ) Notice: Subject to any disclaimer, the term of this patent is extended or adjusted under 35 U.S.C. 154(b) by 0 days.

(21) Appl. No.: 09/366,866

(22) Filed: Aug. 4, 1999

(30) Foreign Application Priority Data

Aug. 4, 1998 (DE) .......................................... 298 13 961
Mar. 23, 1999 (DE) .......................................... 199 13 145

(51) Int. Cl.[7] ............................................. B60R 21/26
(52) U.S. Cl. ....................................... 280/736; 280/741
(58) Field of Search ................................ 280/736, 737, 280/741, 742; 102/530

(56) References Cited

U.S. PATENT DOCUMENTS

| 3,692,495 | A | | 9/1972 | Schneiter et al. |
| 3,810,655 | A | | 5/1974 | Pracher |
| 3,882,673 | A | | 5/1975 | Doin et al. |
| 5,462,307 | A | | 10/1995 | Webber et al. |
| 5,487,561 | A | * | 1/1996 | Mandzy et al. ............. 280/741 |
| 5,601,310 | A | | 2/1997 | Di Giacomo et al. |
| 5,660,236 | A | * | 8/1997 | Sears et al. .................... 169/72 |
| 5,669,631 | A | * | 9/1997 | Johnson et al. ............. 280/741 |
| 5,683,105 | A | | 11/1997 | Jackson |
| 5,713,596 | A | | 2/1998 | Messina et al. |
| 5,806,884 | A | | 9/1998 | Johnson et al. |
| 5,829,784 | A | * | 11/1998 | Brown et al. ................ 280/737 |
| 5,931,495 | A | * | 8/1999 | Rink et al. ................... 280/737 |
| 6,036,226 | A | * | 3/2000 | Brown et al. ................ 280/736 |
| 6,039,347 | A | * | 3/2000 | Maynard ...................... 280/736 |
| 6,068,288 | A | * | 5/2000 | Karolek et al. .............. 280/735 |
| 6,076,468 | A | * | 6/2000 | DiGiacomo et al. ........ 102/530 |

FOREIGN PATENT DOCUMENTS

| DE | 19519678 | | 12/1996 |
| DE | 19753489 | | 7/1998 |
| DE | 19726276 | | 12/1998 |
| DE | 29813961 | | 1/1999 |
| DE | 29821232 | U1 | 5/1999 |
| GB | 2292788 | | 3/1996 |
| GB | 2294999 | | 5/1996 |
| JP | 04006192 | | 1/1992 |
| WO | 9748581 | | 12/1997 |
| WO | 9833684 | | 8/1998 |

OTHER PUBLICATIONS

U.S. Patent application Ser. No. 09/449,392, filed Nov. 26, 1999. Linder et al. Gas Generator For a Safety System.

* cited by examiner

Primary Examiner—Eric Culbreth
Assistant Examiner—David R. Dunn
(74) Attorney, Agent, or Firm—Tarolli, Sundheim, Covell, Tummino & Szabo L.L.P.

(57) ABSTRACT

A gas generator for a safety system, in particular for a vehicle occupant restraint system, comprises a combustion chamber filled with propellant, in which a hot gas is generated after igniting and burning of the propellant, a fluid chamber containing a fluid, a mixing chamber in which fluid and hot gas are mixed in a mixture ratio, and at least one control device which controls the mixture ratio of fluid and hot gas in the mixing chamber.

20 Claims, 4 Drawing Sheets

GAS GENERATOR WITH CONTROLLABLE FLUID INJECTION

TECHNICAL FIELD

The invention relates to a gas generator for a safety system, in particular for a vehicle occupant restraint system.

BACKGROUND OF THE INVENTION

U.S. Pat. No. 5,487,561 discloses a fluid generator which for cooling the generated hot gas uses a fluid which is stored in a chamber surrounding the combustion chamber in a ring shape. If the ignition circuit of the gas generator is now closed, an air chamber is exposed to increased pressure. This leads to a separating member, mounted movably in it, which separates the fluid propellant from the air in the chamber, to be displaced. Through the increased pressure, openings provided in the separating element, which are otherwise tight, become free and the propellant can react exothermically in the air chamber. The generated hot gas can then flow through the openings contained in this chamber into a cooling chamber and can be cooled down by fluid evaporation.

The cooling of the hot gas is therefore necessary because the safety system which is to be filled, in particular the gas bag, can come into contact with vehicle occupants. In order to protect them from burning, the temperature must be cooled down to a compatible extent.

U.S. Pat. No. 5,060,973 discloses a gas generator which has a storage chamber in which liquid propellant is stored and has a reaction chamber in which hot gas is generated and fills the gas bag through openings which are provided. This generator, of course, has no cooling possibilities of any kind.

In the gas generators known hitherto, the fluid injection takes place in an uncontrolled and non-controllable manner, because always the entire fluid is injected.

In the known systems, it is in addition disadvantageous and dangerous if for instance too much fluid is admixed to the hot gas. Through the specific viscosity, the surface tension and the higher inertia of the fluid compared with the gaseous elements of the gas generator, the fluid droplets can not be accelerated as quickly as the gas. In the worst case, this can lead to a blocking, i.e. a clogging, of the openings of the system.

An optimum filling of the gas bag is only possible if a perfectly tempered gas mixture flows into the gas bag in a minimum time span in the millisecond range.

BRIEF SUMMARY OF THE INVENTION

To avoid these disadvantages, the present invention provides a gas generator comprising a combustion chamber filled with propellant, in which a hot gas is generated after igniting and burning of the propellant, a fluid chamber containing a fluid, a mixing chamber in which fluid and hot gas are mixed in a mixture ratio, and at least one control device which controls the mixture ratio of fluid and hot gas in the mixing chamber.

The control device is responsible for the sequence and the development of the injection process. It can be formed by one or more control valves, which is/are in engagement via a gas conduit pipe with the hot gas and the fluid contained in the fluid chamber.

Further, the invention provides for a rapid control of the injected quantity of fluid, which is achieved by at least one control valve, through which the fluid flows and which controls the quantity of fluid flowing into the mixing chamber. The gas generator according to the invention controls, in this embodiment, the quantity of fluid supplied to the hot gas and hence also the mixing ratio of hot gas to injected fluid. The control device is able to provide different mixture ratios. This control takes place directly, i.e. the injected quantity of fluid is not controlled for instance indirectly via the supply of a compressed gas which in turn displaces a separation element, but rather the valve acts directly on the fluid. This has numerous advantages:

The valve is exposed to a cold stream of fluid and not for instance to a hot gas stream. As in the hot gas stream impurities are also entrained, the danger exists of blocking of the valve. However, this can no longer be the case when the fluid flows through the valve. Also a damaging of the valve by the hot gas stream or the entrained impurities is ruled out. Finally, in a valve which control s the hot gas, under pressure, to actuate a displaceable separation element, the valve must be designed both as a ventilation- and also as an evacuation valve. For in order to interrupt the injection process of the liquid propellant, the pressure behind the separation element must be decreased suddenly to the level of the pressure in the mixing chamber. A ventilation- and evacuation valve, however, requires a large space, because it has to have a large cross-sectional area in order to achieve short switching times.

Preferably, the control valve according to the invention is arranged at an outlet of the fluid chamber.

In a further embodiment of the invention, an ejection piston is arranged in the fluid chamber, which piston separates fluid contained in the chamber from the gas which is likewise contained, and is controlled by the control device.

Advantageously, the control device comprises an external control possibility, i.e. one which operates independently of current combustion conditions, such as the generated pressure of the hot gas. This is achieved according to the invention by a lifting magnet which can be controlled in a suitable manner, so that—according to requirements—more or less fluid is injected.

Alternatively, other control elements are also possible, such as a piezo crystal or a rotary drive with threaded spindle.

If the controlling of the injected quantity is to take place exclusively on the basis of the pyrotechnic pressure conditions, then the control device in the form of a valve is triggered as a function of the gas pressure before the valve needle. The gas pressure occurring on the side of the ejection piston adjacent to the valve, and hence the quantity of injected fluid, is proportional to the opening state of the valve. This appears to be useful if for instance the quantity of fuel in the fuel chamber and hence also the quantity of the generated hot gas varies, so that with a reduced quantity of hot gas also less fluid needs to be injected and vice versa.

In the preferred embodiment of the invention, the control device in fact has a combination of the possibilities illustrated in the last two paragraphs, so that the control takes place both on the basis of the generated pressure conditions and also externally.

A preferred embodiment of the invention consists in that the control device regulates the quantity of fluid flowing into the mixing chamber. In so doing, the control device comprises in addition one or more pressure sensors, which detect the pressure of the generated hot gas and pass it on to a preferably microelectronic control- or even regulating unit, which in turn then regulates the stroke of the ejection piston.

In a preferred embodiment, a fluid guiding pipe is arranged downstream of the fluid chamber, in the interior of which pipe the fluid is guided from the fluid chamber to the mixing chamber. The control valve preferably is arranged between the fluid chamber and the fluid guiding pipe, however, it can also be arranged at the end of the fluid guiding pipe.

A simple construction of the valve is achieved in that the fluid pipe has through-flow openings which can be opened to a greater or lesser extent by displacement of a slider which is part of the control valve. The slider is arranged here on the fluid guiding pipe.

In order that the coil which must actuate the slider is as close as possible to the slider, the latter has a tubular part arranged on the fluid pipe and has a, with respect to the pipe, radially outer tubular part. This latter tubular part adjoins the coil. Ribs connect the tubular parts and permit an inflow of the fluid into the cavity between the two tubular parts.

The most varied of restraint systems exist for vehicle occupants. They differ not least according to their installation site in the vehicle, in the type of pyrotechnic propellant which is used and in the filling concept which is applied. Depending on these parameters, with an optimally designed system also the mixing process must be controlled, for instance with regard to the quantity of the fluid which is to be injected and with regard to the time behavior of the injection process. This becomes possible through the invention.

DETAILED DESCRIPTION OF PREFERRED EMBODIMENTS

Figure 1:
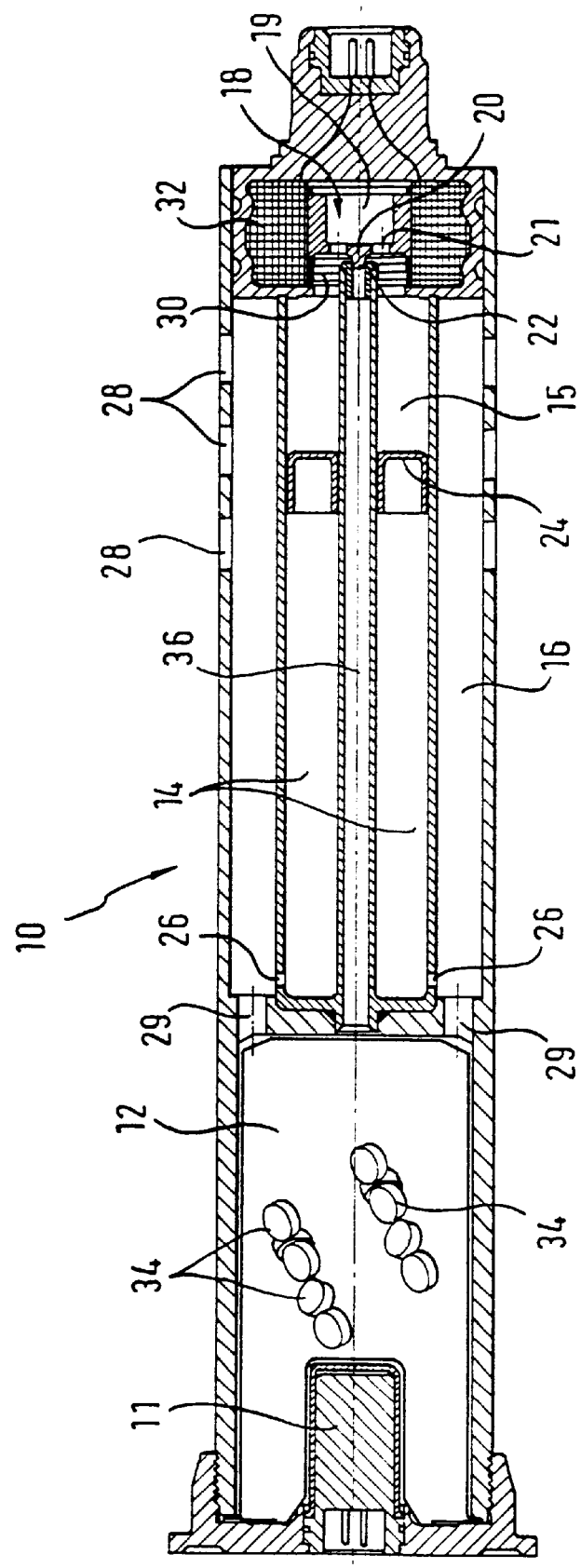
FIG. 1 shows a sectional illustration of a gas generator according to the invention.

The tubular gas generator, generally designated by 10, is illustrated in FIG. 1. In this embodiment it is constructed as a fluid gas generator with a substantially cylindrical shape. Here, it comprises four chambers, a combustion chamber 12, a fluid chamber 14, a pressure chamber 15 and a mixing chamber 16.

The combustion chamber 12 contains, in addition to the pyrotechnic solid propellant 34, an ignition unit 11. After the igniting of the solid propellant 34, hot gas is generated.

The gas generator 10 has in addition a central gas conduit pipe 36, which is intended for guiding a portion of the stream of hot gas after ignition. The gas conduit pipe 36 opens into a control device which in this development of the invention is constructed as a control valve 18. This has a valve needle 20 and a valve seat 22, a spring 30 and a lifting magnet 32.

The fluid chamber 14 is substantially of cylindrical form and embraces the gas conduit pipe 36. The fluid contained in the fluid chamber 14 is separated from the hot gas arriving into the pressure chamber 15 by an ejection piston 24. The ejection piston 24 preferably comprises a seal which is intended to make the mass transfer between fluid in the fluid chamber 14 and hot gas in the pressure chamber 15 impossible. The fluid contained in the fluid chamber 14 can also be a combustible fluid in addition to a pure cooling agent.

The fluid chamber 14 is surrounded by the mixing chamber 16 and is connected with it via openings 26. In the preferred embodiment, the openings 26 are arranged close to the inflow opening 29 for hot gas between combustion chamber 12 and mixing chamber 16, so that a maximum degree of mixing can be achieved between the hot gas which is to be mixed and the fluid. For the same reason, radial outlet openings 28 between the mixing chamber 16 and the gas bag are arranged as far away as possible from the openings 26, 29, more precisely at the axial end of the mixing chamber lying opposite the openings 26, 29.

The mode of operation of the gas generator 10 can be seen in addition from FIG. 1, maintaining that state of the system, in which the ejection piston 24 has already moved a distance.

The generated hot gas flows partially after igniting of the gas generator 10 out of the combustion chamber 12 via the gas conduit pipe 36 and partially via inflow openings 29 into the mixing chamber 16. The gas conduit pipe 36 opens into the control device which is constructed as a control valve 18 in the form of a needle valve. In an alternative embodiment, the valve is constructed as a slide valve.

The basic position of the valve 18 is determined by the prestressing of the spring 30. This rests on its internal face, close to the center, against a wall and holds the valve 18 in opened state. If hot gas now flows through the gas conduit pipe 36 and onto the valve needle 20, which is cup-shaped and delimits a valve space 19 forming a part of the pressure chamber 15, then it will arrive as compressed gas into the valve space 19 and via rearward openings 21 in the valve needle 20 into the pressure chamber 15 and will drive the ejection piston 24. In addition, the stroke of the ejection piston 24 is controlled by the control current for the lifting electromagnet 32. This acts on the valve needle 20 such that the latter draws close to the valve seat 22 and the valve 18 is closed (position shown). Through suitable controlling of the lifting magnet 32, therefore according to the current requirement more or less fluid can be injected into the upstream end of the mixing chamber via the openings 26, which up to a certain pressure are closed by a foil. Another part of the hot gas arrives via the openings 29 into the mixing chamber and mixes there with the fluid injected close to the opening 29 on the way to the outlet openings 28.

The controlling of the lifting magnet 32 can take place according to the invention such that the stroke of the ejection piston 24 is dependent on or independent of the gas pressure of the hot gas.

If it is to be dependent thereon, then the magnet 32 is not actuated—or only supporting the gas pressure—, and hence the stroke of the piston 24 is proportional to the existing gas pressure. If a large amount of hot gas is generated, the pressure is high, the valve 18 is opened wide and the ejection piston 24 in turn generates an increased expressing pressure onto the fluid, so that a large amount of fluid is supplied to the hot gas. Vice versa, with a lower hot gas pressure, also less fluid is injected.

If the controlling of the fluid injection is now to take place independently of the hot gas pressure, then through activation of the lifting magnet 32 the effect of the control valve 18, controlled by hot gas, can even be neutralized. This means that even with for example a high gas pressure, the valve 18 is almost closed and is only opened successively (whilst for instance the gas pressure can already drop), so that a control is achieved which is almost contrary to the pressure conditions. With this embodiment, the possibility exists of uncoupling the control of the fluid injection from the pressure of the hot gas. The parameters, on the basis of which the control device is then controlled, can lie for example in the size of the gas bag which is to be filled, in the use or the installation site of the gas generator or in the type of pyrotechnic filling concept. This functionality of the invention comes into the forefront in particular when a specific folding of the gas bag makes it necessary to allow mixed gas to flow from the mixing chamber 16 only rising successively into the gas bag, in order to achieve in the final effect the quickest possible unfolding.

In the solution according to the invention, it proves to be particularly advantageous that the gas generator 10 does not necessarily always have to inject the entire quantity of fluid, as is the case in the systems known hitherto. Thereby, the flexibility of the system is increased enormously and a module-like use of gas generator units is possible for various applications.

In order to further increase the control possibilities, it is conceivable to additionally arrange one or more control valves 18 in the region between the combustion chamber 12 and the mixing chamber 16, such that the quantity of the injected fluid and the quantity of the supplied hot gas is controlled.

In other developments of the invention, several control valves 18 can also be combined into a control device, which valves may be arranged at different sites inside the gas generator 10.

In a further developed embodiment of the invention, the control device is constructed such that with further components of the gas generator 10, such as at least one pressure sensor, it represents a regulating circuit, which means that the control device regulates the mixture ratio between fluid and hot gas.

Figure 2:
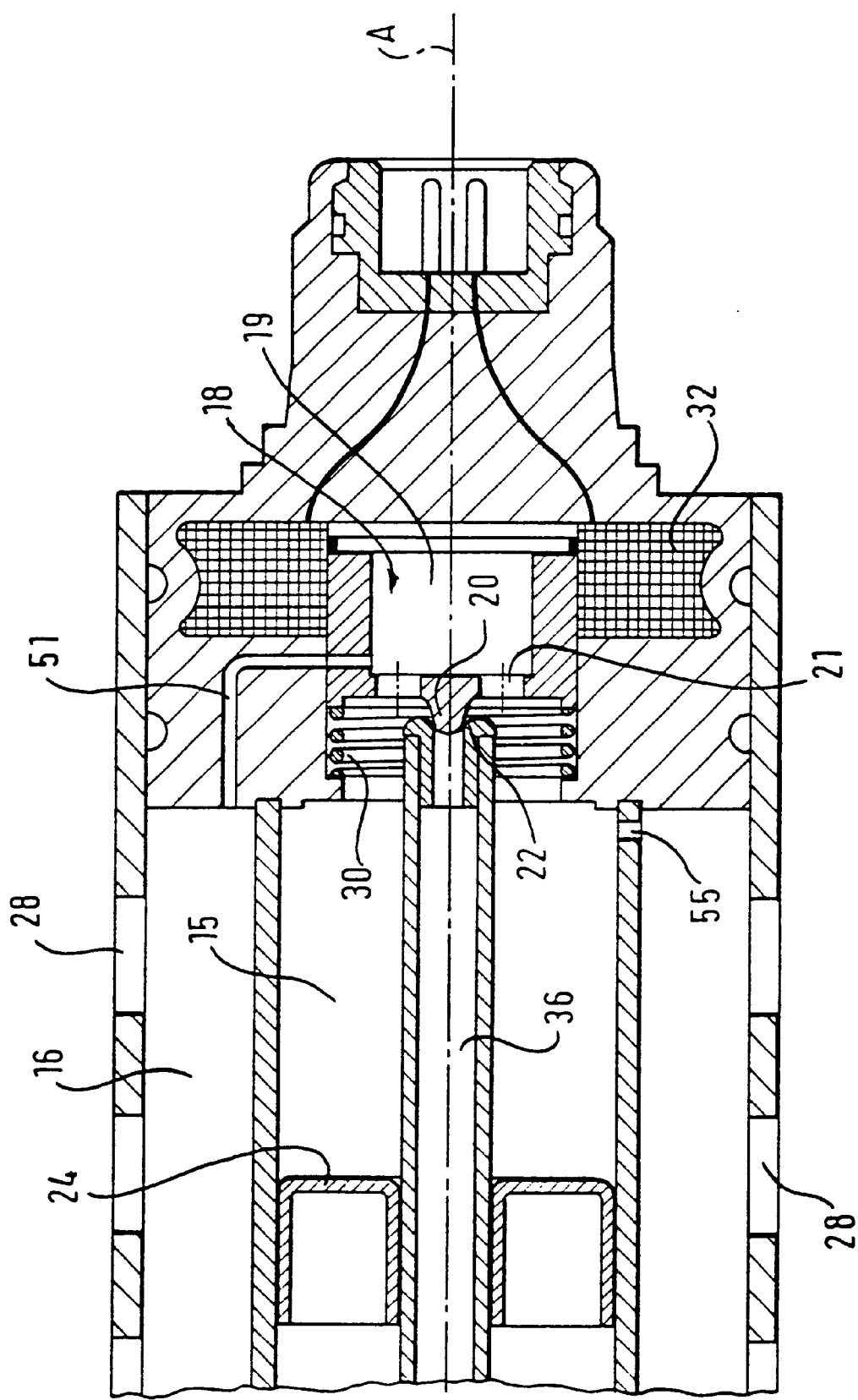
FIG. 2 shows an enlarged sectional view of only the right end of the gas generator shown in FIG. 1, which is modified in this region.

The supply of fluid into the mixing chamber can also be stopped during the outflow of hot gas. For this, the control device 18 is actuated accordingly, and the valve needle 20 presses onto the valve seat, as is shown in FIG. 2. Owing to the expansion of the walls of the pressure chamber, connected with the inflow of hot gas into the pressure chamber, and to the compression of the hot gas in the pressure chamber 15, to which the valve chamber 19 also belongs, it can occur, however, that in spite of the closed valve a further and undesired displacement of the ejection piston 24 additionally takes place. In order to prevent this, the provisions shown in FIG. 2 and explained in further detail hereinbelow are made. The upper half, above the central axis A, shows a first embodiment and the lower half shows a second embodiment.

In the upper embodiment, a discharge channel 51 extends from the valve chamber 19 to the mixing chamber 16. The cup-shaped valve needle 20 has an opening in its wall on the covering side, which opening also defines the discharge channel 51. In the closed position of the valve, shown in FIG. 2, the section of the outlet channel present in the valve is in alignment with the section of the outlet channel provided in the end wall. Hence the mixing chamber 16 is in flow connection with the valve space 19 and hence also with the part of the pressure chamber 15 which lies to the left of the valve needle 20.

If the supply of fluid is to be stopped, then the valve closes and the excess pressure still present in the pressure chamber 15 together with the valve space 19 will decrease rapidly. Hence the movement of the ejection piston 24 stops immediately after the closing of the valve 18.

The lower half of FIG. 2 differs from the embodiment according to the upper half in that the discharge channel 55 originates from the part of the pressure chamber 15 which does not form the valve space 19. The discharge channel 55 is merely a small opening in the peripheral wall delimiting the pressure chamber 15 from the mixing chamber. Via this discharge channel 55, which is not able to be closed, the pressure in the pressure chamber 15 can decrease rapidly after the closing of the valve 18. However, the cross-section of the discharge channel 55 is selected to be so small that it scarcely influences the power of the hot gas in the case of intentional displacement of the ejection piston 24.

Figure 3:
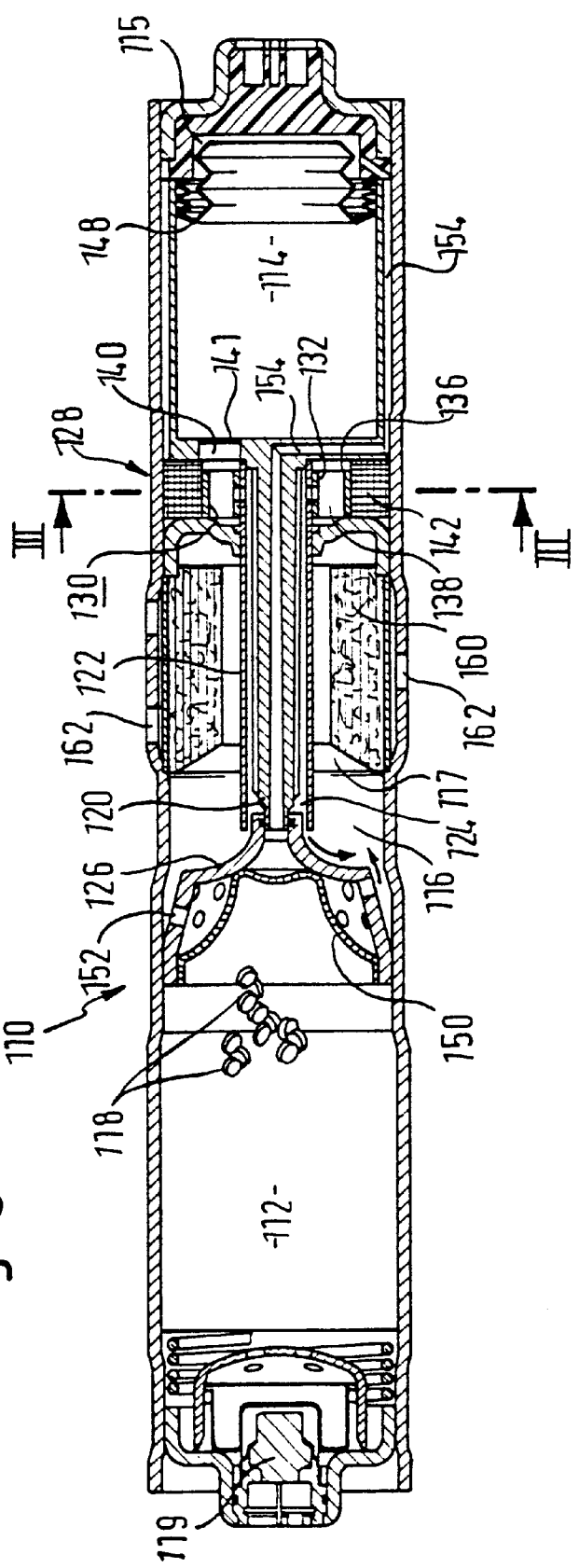
FIG. 3 shows a longitudinal sectional view through a further embodiment of the gas generator according to the invention.

The tubular gas generator 110 shown in FIG. 3 has a combustion chamber 112, a fluid chamber 114, a pressure chamber 115 and also a mixing chamber 116. A filter chamber is designated by 117.

The combustion chamber 112 contains an ignition unit 119 in addition to the pyrotechnic propellant 118.

Figure 4:
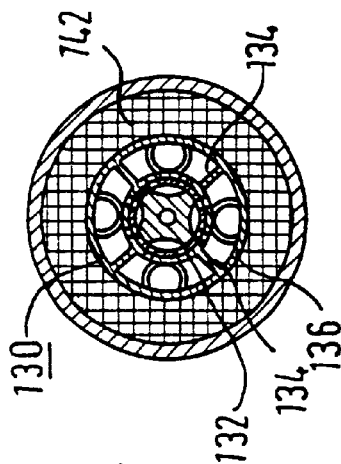
FIG. 4 shows a section along the line III—III in FIG. 3, which shows the valve in closer detail.
Figure 5:
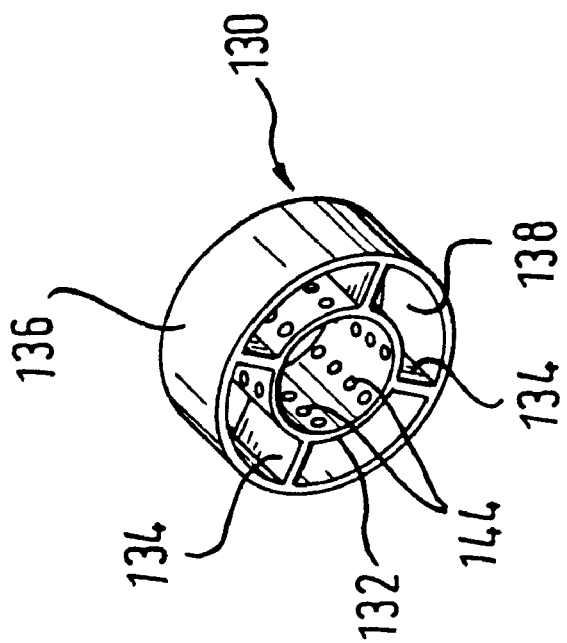
FIG. 5 shows a perspective view of the fluid guiding pipe already shown in FIG. 3.

Furthermore, the gas generator has a central gas guiding pipe 120 which directs a portion of the hot gas stream to the pressure chamber 115 after ignition. The gas guiding pipe 120 is surrounded by a fluid guiding pipe 122, so that between the gas guiding pipe 120 and fluid guiding pipe 122 an annular duct 124 is formed which extends up to the mixing chamber 116 and ends there at a cone-shaped end wall 126. At the upstream end of the fluid guiding pipe 122, a control valve 128 is arranged which is constructed as a solenoid valve. The control valve 128 comprises a slider 130 which can be seen more clearly in FIGS. 4 and 5. The slider 130 has a tubular part 132 arranged on the fluid guiding pipe 122 and has an outer tubular part 136 connected therewith via numerous ribs 134 and arranged coaxially to the tubular part 132. Between the tubular parts 132 and 136, a cavity 138 is produced. Fluid can flow into this cavity via openings 140 from the fluid chamber 114. The fluid chamber 114 is closed with respect to the opening 140 in the not yet actuated state, by a diaphragm 141 being arranged in front of the opening 140. The control valve 128 has a coil 142 which surrounds the radially outer tubular part 136.

Figure 6:
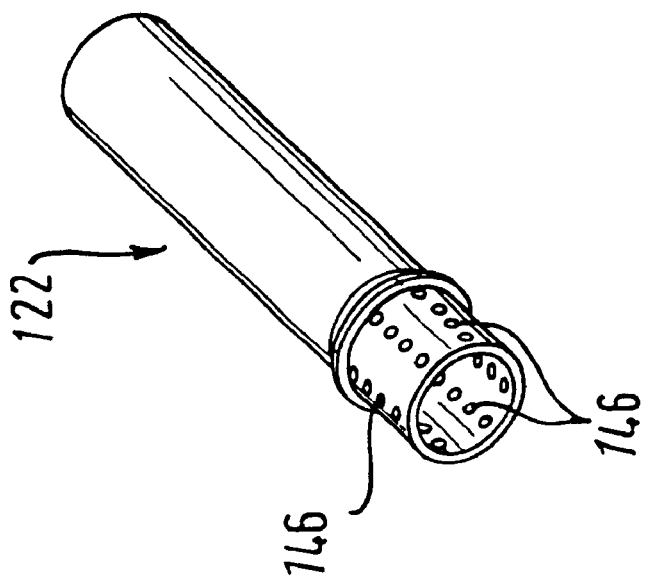
FIG. 6 shows a perspective view through the slider arranged on the fluid guiding pipe according to FIG. 3.

The coil 142 can move the slider 130 axially. Usually, a spring, which is not shown, is present, which brings the slider 130 into a defined initial position when the coil is out of circuit. Numerous radial through-flow openings 144 in the part 132 can be in alignment with radial openings in the fluid guiding pipe 122 in a corresponding axial position of the slider 130, or can be covered by the slider 130. The openings in the fluid guiding pipe 122 can be seen better in FIG. 6 and are marked by reference number 146.

In FIG. 3, for better illustration, only one opening is illustrated in the fluid guiding pipe and one in the slider, by way of example.

The fluid chamber is separated from the pressure chamber by a bellows 148. The bellows 148 forms an expressing piston.

On igniting of the pyrotechnic solid propellant 118, hot gas is produced. This gas firstly destroys a screen 150 and then arrives partially via openings 152 into the mixing chamber. However, another portion of the hot gas arrives into the pressure chamber 115 via the centrally arranged gas guiding pipe 120 and an adjoining duct 154. The pressure building up here leads to the axial displacement of the bellows 148 towards the left. Thereby, fluid is pressed via the openings 140 into the cavity 138. The position of the slider 130 is controlled by means of a control current. The openings 144 and 146 come to overlap to a greater or lesser extent, so that more or less fluid arrives into the mixing chamber 116 via the duct 124.

The control valve 128 controls the quantity of injected fluid On and hence the mixing ratio of hot gas to fluid.

The fluid flowing into the mixing chamber flows along the conical end wall 126 outwards in the arrow direction. The resulting fluid film becomes thinner and th inner with an increasing flow path and breaks away at an edge, where it also hits onto the hot gas stream, which arrives into the mixing chamber through the openings 152. The gas evaporates the fluid. The mixture flows obliquely radially inwards into the filter chamber and arrives there via filter 160 to radial outflow openings 162, from where it flows for example into a gas bag. The fluid can be combustible or non-combustible.

By the quantity of fluid arriving into the duct 124 being controlled at the outlet of the fluid chamber 114, the fluid stream can also be stopped immediately, i.e. without delay. A clogging of the control valve 128 is almost impossible, because only the fluid flows through it which is free of impurities or foreign bodies. The controlling of the valve 128 is very simple: the valve can, for example, be designed such that the quantity of injected fluid is proportional to the current guided through the solenoid.

The valve 128 can be controlled chronologically before and/or during the activation of the gas generator. For example, it is possible to open the valve fully or partially before activation of the gas generator, in order to thereby make available the necessary quantity of fluid on activation of the gas generator. This quantity depends above all on the restraint system which is supplied with gas by the gas generator. The valve position and hence the through-flow openings can, however, also be altered during the activation of the gas generator.

If the so-called valve holding time, i.e. the time in which the valve assumes a predetermined position, is to be shortened, then a so-called pulsing of the valve is also possible. This means that the valve is opened and closed again several times in extremely short time intervals, whilst hot gas is generated. Through the pulsing valve, the same quantity of fluid can be introduced into the mixing chamber as also arrives into the mixing chamber with a partially opened valve. With a pulsing valve, however, the sealing of the parts of the valve is improved and simplified, because shorter valve holding times are present.

What is claimed is:

1. A gas generator for a safety system, in particular for a vehicle occupant restraint system, said gas generator comprising:
    a combustion chamber filled with propellant, in which a hot gas is generated after igniting and burning of said propellant,
    a fluid chamber containing a fluid,
    a mixing chamber in which fluid and hot gas are mixed in a mixture ratio,
    at least one control device which controls said mixture ratio of fluid and hot gas in said mixing chamber,
    a pressure chamber separated from said fluid chamber by an ejection piston,
    compressed gas being introduced into said pressure chamber for displacing said ejection piston,
    at least a portion of said hot gas forming said compressed gas and this portion arrives into said pressure chamber via at least one conduit,
    said control device controlling the quantity of compressed gas flowing into said pressure chamber,
    said conduit being constituted by a central gas conduit pipe through which, after ignition, at least a portion of said hot gas flows out of said combustion chamber to said control device.

2. The gas generator according to claim 1, wherein said control device is formed by at least one control valve able to provide different mixture ratios.

3. The generator according to claim 1, wherein said control device controls the quantity of fluid flowing into said mixing chamber.

4. The gas generator according to claim 2, wherein said control valve controls the quantity of fluid flowing into said mixing chamber and wherein said fluid flows through said control valve.

5. The gas generator according to claim 4, wherein said control valve is arranged on an outlet of said fluid chamber.

6. The gas generator according to claim 1, wherein said control device controls a pressure in said pressure chamber.

7. The gas generator according to claim 1, wherein said control device controls a quantity of compressed gas flowing into said pressure chamber.

8. A gas generator for a safety system, in particular for a vehicle occupant restraint system, said gas generator comprising:
    a combustion chamber filled with propellant, in which a hot gas is generated after igniting and burning of said propellant,
    a fluid chamber containing a fluid,
    a mixing chamber in which fluid and hot gas are mixed in a mixture ratio,
    at least one control device which controls a mixture ratio of fluid and hot gas in said mixing chamber,
    a pressure chamber separated from said fluid chamber by an ejection piston and
    a discharge channel originating from said pressure chamber via which channel hot gas which is introduced into said pressure chamber can flow out into an environment with lower pressure, after stopping the supply of further hot gas.

9. The gas generator according to claim 8, wherein said control device controls a quantity of hot gas flowing into said pressure chamber, wherein said control device also opens and closes said discharge channel and wherein on shutting off the supply of said hot gas into said pressure chamber also said discharge channel is closed.

10. The gas generator according to claim 8, wherein at least one opening is provided in the region of inflow openings for hot gas opening into said mixing chamber and is provided between said fluid chamber and said mixing chamber.

11. The gas generator according to claim 10, wherein said mixing chamber has at least one outlet opening which connects the interior of said mixing chamber with the interior of said restraint system which is to be filled, wherein said mixing chamber is an elongated annular chamber which surrounds said fluid chamber, and wherein said outlet opening is arranged in the region of an axial end of said annular chamber opposed to said opening between said mixing chamber and said fluid chamber.

12. The gas generator according to claim 8, wherein said control device is at least one solenoid valve and comprises a spring and a lifting magnet.

13. The gas generator according to claim 8, wherein said fluid is a coolant.

14. The gas generator according to claim 8, wherein said fluid is a combustible fluid.

15. A gas generator for a safety system, in particular for a vehicle occupant restraint system, said gas generator comprising:
- a combustion chamber filled with propellant, in which a hot gas is generated after igniting and burning of said propellant,
- a fluid chamber containing a fluid,
- a mixing chamber in which fluid and hot gas are mixed in a mixture ratio,
- at least one control device which controls a mixture ratio of fluid and hot gas in said mixing chamber,
- downstream of said fluid chamber a fluid guiding pipe being arranged, in the interior of which said fluid being guided from said fluid chamber to said mixing chamber, said control valve being arranged between said fluid guiding pipe and said fluid chamber.

16. The gas generator according to claim 15, wherein said control valve has a movable slider, which is arranged on said fluid guiding pipe.

17. The gas generator according to claim 16, wherein said fluid guiding pipe has through-flow openings which can be opened to a greater or lesser extent by adjusting said slider.

18. The gas generator according to claim 16, wherein said slider has a tubular part arranged on said fluid guiding pipe and a, with respect to said pipe, radially outer tubular part which adjoins a coil, said two tubular parts being connected with each other by ribs.

19. A gas generator for a safety system for a vehicle occupant restraint system, said gas generator comprising:
- a combustion chamber filled with propellant, in which a hot gas is generated after igniting and burning of said propellant,
- a fluid chamber containing a fluid,
- a mixing chamber in which fluid and hot gas are mixed in a mixture ratio,
- at least one control device which controls said mixture ratio of fluid and hot gas in said mixing chamber, and
- a pressure chamber which is separated from said fluid chamber by an ejection piston in such a manner that fluid is prevented from immediately flowing into said pressure chamber during operation of said generator, said pressure chamber being flowingly connected with said combustion chamber to allow said hot gas to flow into said pressure chamber and to displace said ejection piston.

20. A gas generator for a safety system for a vehicle occupant restraint system, said gas generator comprising:
- a combustion chamber filled with propellant, in which a hot gas is generated after igniting and burning of said propellant,
- a fluid chamber containing a fluid,
- a mixing chamber in which fluid and hot gas are mixed in a mixture ratio,
- at least one control device which controls said mixture ratio of fluid and hot gas in said mixing chamber, and
- a pressure chamber which is separated from said fluid chamber by an ejection piston,
- said control device controlling a quantity of hot gas flowing into said pressure chamber.

* * * * *